United States Patent Office 3,143,473
Patented Aug. 4, 1964

3,143,473
STABLE, SOLID, ORAL LIVE ANTIPOLIOMYELITIS VACCINE COMPOSITIONS AND PROCESS FOR PREPARING THEM
Walter Hennessen and Rudolf Mauler, Marburg an der Lahn, and Gerhard Ross, Frankfurt am Main, Germany, assignors to Behringwerke Aktiengesellschaft, Marburg an der Lahn, Germany, a corporation of Germany
No Drawing. Filed Dec. 27, 1961, Ser. No. 162,553
Claims priority, application Germany Aug. 16, 1961
3 Claims. (Cl. 167—78)

The present invention provides stable orally administrable poliomyelitis virus preparations from attenuated live poliomyelitis viruses and a process for preparing them.

In order for poliomyelitis viruses to be suitable for oral administration it is necessary that they be stable. Thus, several methods have been tried to convert polioviruses into a stable form. For example, one has enclosed them in capsules. However, the processing method involved is very cumbersome and time-consuming. Besides, many patients, especially children, do not like to take capsules. Further polioviruses have also been converted into a stable form by mixing them with sugar and then processing the resulting mixture into sugar syrup or into candies (cf. U.S. Patent 2,966,443; Academy of Medical Science of the U.S.S.R., Inst. for Poliomyelitis Research, Moscow, 1960, report No. 2 (December 31, 1959), pages 66, 72, 73). The sugar syrup form has the disadvantage that it does not allow an exact dosage. Further, at room temperature the polioviruses in sugar syrup and in candies are stable a few days only. Another method of converting a suspension of polioviruses intended for oral administration into a stable form, namely by lyophilization, i.e., freeze drying under reduced pressure, is not feasible, because this process destroys the effectiveness of the viruses. Therefore, it was up to now necessary to freeze the polio vaccine, transport it and then to thaw it shortly prior to use.

Now, we have found that stable orally administrable poliovirus preparations can be prepared in simple manner by depositing poliomyelitis viruses on a solid orally tolerated pharmaceutical carrier, preferably sugar candy kernels and drying the kernels so treated under sterile conditions. In order to carry out the process of the present invention, an aqueous suspension of live attenuated poliomyelitis virus of, for example, Sabin's strain Type I having an $ID_{50}$ of $10^{7.835}$ is applied on sugar candy kernels and allowed to dry on them, preferably under sterile conditions. In order to accelerate the drying process, reduced pressure or a sterile gas stream, for example, air may be applied. The drying temperature may be in the range of 0 to 37° C., preferably in the range of 20 to 37° C. The titers are determined in known manner in tissue cultures.

When it is desired not to let the attenuated polioviruses come into contact with the gastric medium, the pharmaceutical carriers, for example, the sugar candy kernels on which the polioviruses are deposited, are coated with a coating resistant to the gastric juice but soluble in the intestine. Such a coating can be applied by the methods usual in galenics and at temperatures ranging from 0 to 37° C., preferably 20 to 37° C., which will not affect the polioviruses (cf. Die Pharmazeutische Industrie, vol. 14 (1952), pages 183 et seq.; Remington's practice of Pharmacy, 1961, chapter 37, "Coating of Tablets, Capsules and Pills," pages 476 et seq.).

The orally administrable polio vaccine obtained by the process of the present invention has good stability. As already mentioned, unfrozen oral polio vaccines are stable at room temperatures a few days only, whereas the poliomyelitis virus preparations prepared by the process of the present invention are storable for six weeks at room temperature without significant loss of activity. This property is of great advantage in the mass application of oral live poliovirus vaccines.

The examples describe the preparation of antipolio vaccines with sugar candy kernels as carriers, on the surface of which the live attenuated polioviruses Type I, II or III or the mixture of these three types are applied and subsequently dried. Each of the sugar candy kernels is coated with the dose required for infecting a person, i.e., about 200,000 to 500,000 $TCID_{50}$ ($TCID_{50}$ = Tissue Culture Infectious Dose$_{50}$).

To prepare vaccines which can be stored for a prolonged period, it is also possible to deposit on the sugar candy kernels a higher dose of polioviruses, for example, the multiple dose required for infecting a person. Thus, for storage purposes, there may be made "multidose" preparations that contain, for example, 50 or 100 times the above-mentioned $TCID_{50}$. Such preparations must, of course, be diluted prior to application, since they are intended to serve for the vaccination of a correspondingly higher number of persons.

Besides sugar candy kernels, any other suitable, orally tolerated substance may be used as the solid carrier; thus, kernels made from gelatin may likewise be used. Sugar candy kernels, however, have the advantage that they dissolve easily in the mouth. With the live attenuated polioviruses of Sabin's Type I, II and III, it is also possible to prepare trivalent oral vaccines. The trivalent vaccines prepared from these three types of virus are likewise stable at room temperature for a period longer than six weeks.

The following examples illustrate the invention but they are not intended to limit it thereto:

*Example 1*

500 sugar candy kernels each (globuli sacchari, diameter 8 mm.) are coated by dropwise applying, at 20° C. in a rotating flask, 20 cc. of a mixture containing 1 part of an aqueous suspension of poliovirus Type I (Sabin) having an $ID_{50}$ of $10^{7.835}$ and 2 parts of a sugar solution (2 parts of sugar per 1 part of water); the kernels are dried at 20° C. with the aid of a sterile air stream and then provided with a protective coating that is soluble in the intestine.

The titers of the sugar candy kernels so treated are:

After manufacture: $10^{5.667}ID_{50} = 665,000$
After storage for 6 weeks: $10^{5.375}ID_{50} = 237,000$ The orally administrable polio vaccine so prepared can be stored for six weeks practically without losing its activity.

*Example 2*

In the manner described in Example 1, there are prepared poliomyelitis virus preparations from polio viruses of Type II (Sabin) having an ID of $10^{7.500}$.

The titers of the sugar candy kernels so treated are:

After manufacture: $10^{5.286}ID_{50} = 193,000$
After storage for 6 weeks: $10^{5.354}ID_{50} = 225,000$ The activity of this preparation is practically not changed by a storage for 6 weeks at 20° C.

*Example 3*

In the manner described in Example 1, there are prepared poliomyelitis virus preparations from polio viruses of Type III (Sabin) having an $ID_{50}$ of $10^{7.714}$.

The titers of the sugar candy kernels so treated are:

After manufacture: $10^{5.685}ID_{50} = 484,000$
After storage for six weeks: $10^{5.417}ID_{50} = 261,000$ The determined titers show that, after storage, the activity of the preparation remained within the error limit of the test.

Example 4

20 cc. of poliovirus Type I (Sabin) having an $ID_{50}$ of $10^{7.835}$, 20 cc. of poliovirus Type II (Sabin) having an $ID_{50}$ of $10^{7.500}$, and 20 cc. of poliovirus Type III (Sabin) having an $ID_{50}$ of $10^{7.444}$ are mixed and processed into a poliomyelitis virus preparation according to the method indicated in Example 1.

The titers of the sugar candy kernels so treated are:

After manufacture: $10^{5.806} ID_{50} = 381,000$
After storage for six weeks: $10^{5.715} ID_{50} = 373,000$ As results from the above data, the preparation containing Type I, II and III viruses can be stored six weeks without losing its activity.

We claim:

1. A process for manufacturing stable, storable orally administrable dosage unit formulations of poliomyelitis vaccine which comprises coating the surface of sugar candy kernels with an aqueous suspension of operative unit dosages of live attenuated poliomyelitis virus, and drying said coated kernels at a temperature within the range of about 0° to 37° C. under a sterile, inert gas stream.

2. An oral antipoliomyelitis vaccine comprising a sugar candy kernel having thereon a dried surface coating of live attenuated poliomyelitis virus, prepared in accordance with claim 1.

3. A process for manufacturing stable, storable orally administrable dosage unit formulations of poliomyelitis vaccine which comprises coating the surface of sugar candy kernels with an aqueous suspension of operative unit dosages of about 200,000 to 500,000 $TCID_{50}$ of live attenuated poliomyelitis virus and drying said coated kernels at a temperature within the range of about 0° to 37° C. under a sterile, inert gas stream.

References Cited in the file of this patent

UNITED STATES PATENTS

| | | |
|---|---|---|
| 2,369,218 | Dick et al. | Feb. 13, 1945 |
| 2,811,483 | Aterno et al. | Oct. 29, 1957 |
| 2,841,528 | Myhre | July 1, 1958 |
| 2,946,724 | Valentine | July 26, 1960 |
| 2,957,804 | Shuyler | Oct. 25, 1960 |
| 2,966,443 | Cox | Dec. 27, 1960 |
| 2,996,431 | Barry | Aug. 15, 1961 |